G. G. GELT.
ELECTROMAGNETIC BRAKE.
APPLICATION FILED MAY 17, 1917.
1,246,257.
Patented Nov. 13, 1917.
2 SHEETS—SHEET 1.
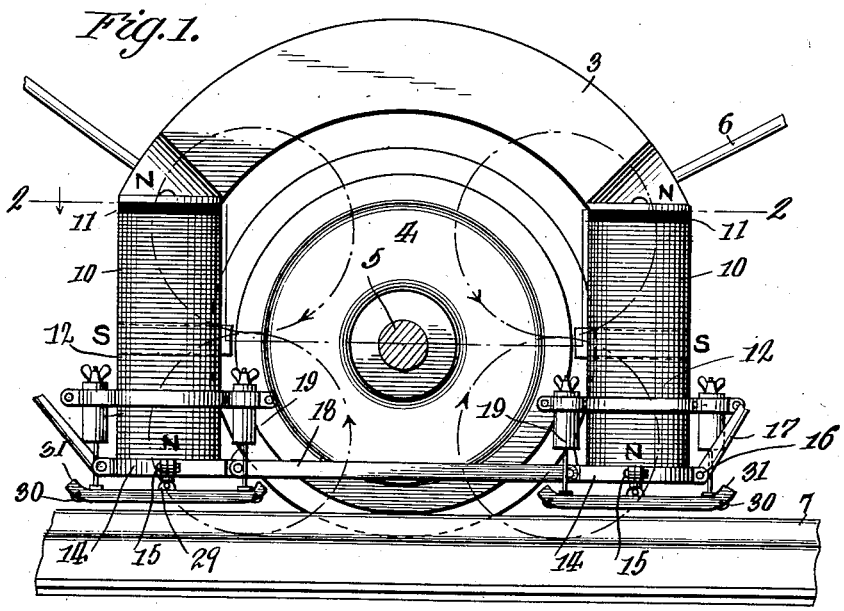
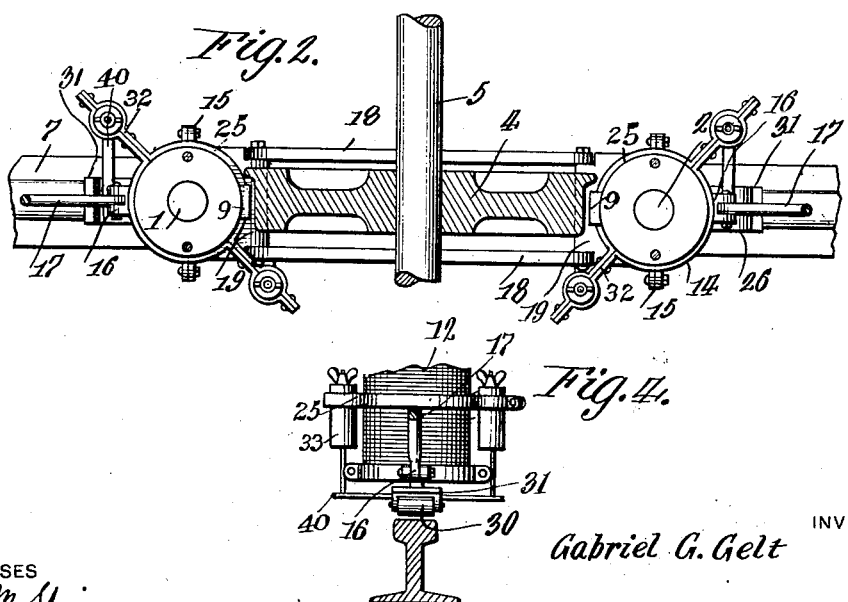
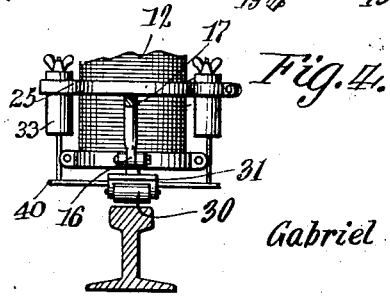
WITNESSES
INVENTOR
Gabriel G. Gelt
BY
ATTORNEY G. G. GELT.
ELECTROMAGNETIC BRAKE.
APPLICATION FILED MAY 17, 1917.
1,246,257.
Patented Nov. 13, 1917.
2 SHEETS—SHEET 2.
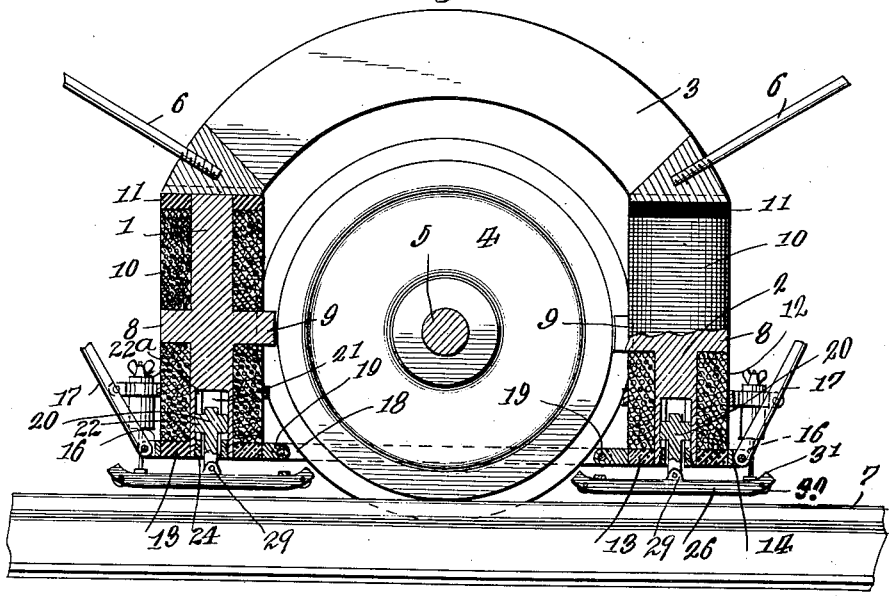
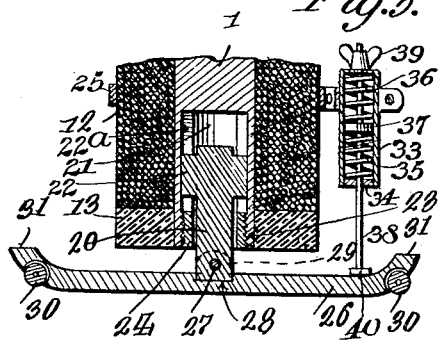
INVENTOR
Gabriel G. Gelt.
WITNESSES
BY
ATTORNEY

UNITED STATES PATENT OFFICE.

GABRIEL G. GELT, OF BOSTON, MASSACHUSETTS.

ELECTROMAGNETIC BRAKE.

1,246,257.  Specification of Letters Patent.  Patented Nov. 13, 1917.

Application filed May 17, 1917. Serial No. 169,360.

*To all whom it may concern:*

Be it known that I, GABRIEL G. GELT, a citizen of the United States, residing at Boston, in the county of Suffolk and State of Massachusetts, have invented certain new and useful Improvements in Electromagnetic Brakes, of which the following is a specification.

My invention relates to improvements in electro-magnetic vehicle brakes, and it consists in the constructions, combinations and arrangements herein described and claimed.

An object of my invention is to provide a brake adapted more particularly for vehicles movable upon steel rails, consisting of brake shoes mounted in proximity with the vehicle wheels and movable toward the steel rails by the action of solenoid magnets, a magnetic path being completed through the brake shoe, the steel rail and a portion of the wheel upon application of the brake, the braking action being accomplished by the combined cohesion of the brake shoe to the rails through the influence of the magnetic current, and the necessity of the metallic wheel moving through a portion of the magnetic field, thus exerting a coercive force thereupon.

Another object of the invention is to provide a vehicle brake including combined solenoid and electromagnets disposed at either side of a metallic vehicle wheel, the solenoid magnet having movable cores therein carrying metallic brake shoes, the energization of the respective magnets causing the metallic brake shoes to move into engagement with the metallic rail and simultaneously complete a magnetic circuit through the shoes, the metallic rail, and a portion of the metallic wheel, while a magnetic circuit is completed through the electro-magnet, a metallic connecting yoke and another portion of the wheel, the combined frictional and braking effect of the shoes and the electro-magnetic current through the wheel exerting a coercive effect upon the wheel to stop the vehicle.

Another object of the invention is to provide a vehicle brake of the class described including solenoid magnets having movable cores to which removable brake shoes are secured, the brake shoes including friction rollers at their ends whereby the jars of striking abutments along the rails is lessened.

Other objects and advantages will appear from the following specification, reference being had to the accompanying drawings, in which:—

Figure 1 is a side elevation of a vehicle wheel illustrating the application of the electro-magnetic brake at the sides thereof, the metallic brake shoes being in normal or in-operative positions, the magnetic circuit hereinafter more fully described, being indicated by dot and dash lines, Fig. 2 is a horizontal section taken on the line 2—2 of Fig. 1, Fig. 3 is a side elevation similar to Fig. 1, portions of the brake being shown in section to illustrate the construction of the solenoid and electro-magnets, Fig. 4 is a detail cross-section illustrating more particularly one of the brake shoe rollers, and Fig. 5 is an enlarged detail section of the lower portion of one of the solenoid magnets and showing the brake shoe, the view being somewhat distorted to also illustrate one of the spring held plungers.

In carrying out my invention, I provide a pair of magnet cores 1 and 2 which are secured in any suitable manner to a supporting yoke 3 at either side of a metallic vehicle wheel 4. The vehicle wheel 4 is mounted upon an axle 5 which is suitably journaled in the truck of the vehicle not shown in the drawings. The yoke 3 is also supported upon the truck of the vehicle in any suitable manner and is provided with stay rods 6 by which additional rigidity and stability of the brake device is secured.

The vehicle wheels 4 move upon a steel rail 7, the wheel 4 forming a portion of paths of magnetic circuits at the rail 7, in a manner hereinafter to be more fully explained.

The magnet cores 1 and 2 include an interpolar head 8 each of which has a laterally extending pole piece 9 which lies in close proximity to the tread of the metallic wheel 4. Electro-magnet wires 10 are wound upon the upper portions of the cores 1 and 2 between the inter-polar heads 8 and dielectric heads 11 and these windings are adapted to be energized by any suitable controller mechanism from a suitable source of electric current such as from an accumulator or storage battery upon the vehicle. The controller mechanism and the accumulator are however not illustrated in the drawings since they are not particularly essential to the understanding of the operation of the invention.

Other electro-magnet wires are wound on the lower portions of the cores 1 and 2 at 12, the windings 12 being located on the cores 1 and 2 between the inter-polar heads 8 and other dielectric heads 13 on the lower end of the cores as shown in Fig. 3. Collars 14 are clamped about the lower heads 13 and secured as at 15. The collars 14 include lateral ears 16 to which brace or stay rods 17 are pivotally secured. An open yoke 18 is secured to other ears 19 of the collars 14, and the yoke 18 embraces a portion of the wheel 4 as clearly shown in Figs. 1 and 3.

A metallic core 20 is movable in a recess 21 in the lower end of each of the cores 1 and 2. The core 20 is guided in its vertical movement, and prevented from turning in the recess 21 by ears 22 which are formed on the sides of the core 20 and engage slots 22$^a$ in the surface of the recess 21. The lower end of the recess 21 is threaded at 23 so that a plug 24 may be screwed therein and keep the core 20 from dropping out.

A second ring 25 is clamped on the body of each of the solenoid magnets 12 a short distance above the ring 14.

Each ring 25 has arms 32 which are in radial alinement as shown in Fig. 2. The arms 32 are disposed at an angle with respect to the longitudinal axis of the brake for the purpose of locating buffer springs which are carried by the arms out of the way of the vehicle wheel 4.

A tubulure 33 is clamped near the end of each of the arms 32. A plug 34 closes the open end of each tubulure 33 and supports one end of a pair of buffer springs 35 in the tubulure 33. The second one 36 of the pair of buffer springs in each tubulure 33 rests on the upper surface of an abutment 37 on a plunger 38. The upper end of the lower spring 35 rests on the under surface of the abutment 37.

The tension of each of the pair of springs 35 and 36 is about equal with the result that a brake shoe 26 which is supported on the plungers 38, is held at a predetermined position above the rail 7 somewhat as shown in the drawings. The tension of the springs in the tubulure 33 may be regulated by turning a wing-nut 39 up or down on the threaded end of the plunger 38. The end of the plunger 38 extends beyond the closed end of the tubulure 33 and the wing-nut 39 bears against the tubulure 33. It will be understood more particularly from Figs. 1 and 2, that the buffer springs 35 and 36 have their counter-parts on the ends of each of the arms 32.

The plungers 38 while supporting the brake shoe 26 beneath each of the electro-magnets, are not connected directly to the brake shoes. A stout steel bar 40 is necessary to make the required connection because as above stated, the buffer spring devices are offset from the brake shoes because of the angular relationship of the arms 32 with the longitudinal axis of the brake shoes. The steel bars 40 are of course connected to the lower ends of the plungers 38 and to the brake shoes 26 and thus provide ample support for the brake shoes.

A pin 27 passes through the lower end of each of the plungers 20 and through lateral ears 29 on the brake shoes 26. A recess 28 in the upper surface of each brake shoe 26 receives the lower end of the plunger 20. The purpose of the ears 29, the pin 27 and the recess 28, is to provide a firm attachment for the brake shoe on the plunger 20. Actual practice may demonstrate the necessity of providing some other means of attachment. This is however not so important since obviously the end of the plunger 20 may be expanded into the recess 28 or secured on the brake shoe 26 in any other well known manner.

Abutment rollers 30 are journaled at the extreme and upturned ends 31 of each of the brake shoes 26. In moving over the track rails 7, various obstructions are frequently encountered and it is for the purpose of engaging such obstructions and lessening the consequent shock to the brake shoes 26, that the abutment rollers 30 are provided. The wear to the brake shoe itself, is thus lessened to quite a degree.

The operation of the electro-magnetic brake is as follows: The respective windings 10 and 12 are applied to the respective cores 1 and 2 in such a manner that upon energization of the windings a south pole will be created at the inter-polar head 8, while north poles will be created at the opposite ends of the electro-magnets. It will thus be evident that the magnetic lines from the north poles will move in the direction indicated by the arrows in Fig. 1 and by reason of the inter-polar heads 8 being located at a south pole, the magnetic lines of force will move in clockwise and counter-clockwise directions respectively, the major portion of the metallic vehicle wheel 4 being embraced in the electro-magnetic flux.

In arranging the device in the manner above stated whereby the vehicle wheel 4 will move in a strong magnetic field, one of the important objects of the invention is attained.

It will be evident that whenever it is desired to apply the brakes, the energization of the various magnets creates magnetic fluxes which will have a powerful coercive effect upon the wheel, which in addition to the braking effect of the shoe 26, will quickly stop the movement of the vehicle.

Upon energization of the solenoid magnets 12 whereby the magnetic lines of force will emanate at the N pole the movable cores 20 will be attracted to the rails against the tension of the lower spring 35. The brake shoes 26 are thus applied to the treads of the rails 7 with a pressure proportionately as great as the energizing current through the respective solenoid magnets. In addition to the mechanical braking effect upon application of the shoes 26 to the rails 7, a magnetic circuit or path is completed through each shoe 26, the adjacent portion of the rail 7 and the adjacent portion of the vehicle 4. The lines of force will travel substantially in the directions indicated by the lower circular arrows in Fig. 1 where it will be seen that a considerable portion of the wheel 4 is embraced in the magnetic circuit. Obviously the effect of these magnetic circuits will be to retard the forward rotation of the wheel 4 and assist in bringing the vehicle to a stop.

With the use of the invention as above outlined it will be evident that two important factors are introduced to act upon the moving vehicle wheel 4 and bring it to rest. The first factor is the mechanical engagement of the brake shoes 26 with the rails 7 through the influence of the energized solenoid magnets 12. The second factor is the creation of magnetic fields through which the wheel is forced to move with the consequent retarding effect upon the rotation of the wheel 4.

It will at once be evident that the braking effect upon the vehicle is had directly upon the treads of the rails and not upon the treads of the vehicle wheels. The great beneficial result of this arrangement will be that "flat wheels" will be obviated and that all of the wear occurs upon the brake shoes 26. By reason of the cheapness with which the brake shoe 26 can be manufactured and the ease with which it may be applied to the movable cores 20 of the solenoid magnets 12, makes the ready replacement of the brake shoes a simple matter. Another advantage of the invention is this, that when the energizing current is opened through the medium of the controller (not shown) the hysteresis of the magnetic flux in the metallic brake shoes 26 will cause the coherence of the shoes for perhaps a short but appreciable length of time before the tension of the retaining or buffer springs 35 will move the brake shoes clear of the treads of the rails. The advantage here lies in the fact that upon releasing of the brakes no sudden jar will be experienced as is quite often the case where upon applying the brakes to a vehicle and then suddenly releasing them, quite a jar is felt which is annoying in the extreme.

It may be again stated that my invention employs the Foucault or eddy currents common in electro-dynamic machinery for the useful purpose of acting as a braking medium upon the moving wheels of a vehicle.

While the construction and arrangement of the device as illustrated in the drawings is that of a generally preferred form, obviously modifications and changes may be made therein without departing from the spirit of the invention or the scope of the claims.

I claim:—

1. In a vehicle brake, the combination with a wheel and rail, of brake shoes adapted to engage the rail, electromagnetic means for applying the brake shoes and creating eddy currents and other electro-magnetic means for creating eddy currents, the vehicle wheel being movable in the fields of the respective eddy currents.

2. In a vehicle brake, the combination with a vehicle wheel and a rail, of brake shoes adapted to engage the rail, solenoid magnets for applying the brakes, and electro-magnets in alinement with the solenoid magnets, said magnets when energized creating magnetic circuits embracing the wheel and rail for retarding the motion of the wheel together with the brake.

3. In a vehicle brake, the combination with a wheel and rail, of brake shoes normally out of engagement with the rail and adapted to be moved into engagement therewith, solenoid magnets including cores having inter-polar heads arranged in horizontal alinement with the wheel, the brakes being adapted to engage the rail upon energization of the solenoid magnets, a supplemental winding of the magnet above the inter-polar heads, said solenoid magnets and windings being adapted to create magnetic fields embracing the wheel and rail, and means for returning the brake shoes upon deënergization of the magnets.

4. In a vehicle brake, the combination with a wheel and rail, of a core having an inter-polar head at each side of the wheel, windings upon the cores at each side of the inter-polar heads, a brake shoe beneath each core in normal disengagement with the rail and adapted to be moved into engagement with the rail upon energization of the windings, resilient means for supporting the brake shoes, and means for adjusting the tension of the resilient supporting means.

5. In a vehicle brake, the combination with a wheel and rail, of a core having an inter-polar head at each side of the wheel, windings upon the cores at each side of the inter-polar heads, a brake shoe beneath each core in normal disengagement with the rail and adapted to be moved into engagement with the rail upon energization of the windings, resilient means for supporting the brake shoes, means for adjusting the tension of the resilient supporting means, and means for guiding the brake shoes.

6. In a vehicle brake, the combination with a wheel and rail, of a core disposed vertically at each side of the wheel, each of the cores having a recess and an inter-polar head, windings upon the cores at each side of the heads, a supporting yoke joining the cores, supporting means for the lower ends of the cores, a magnet core movable in each recess, a removable shoe upon each core, resilient elements for holding the shoes in normal disengagement with the rail, adjusting means for the elements, and guiding means for the magnet cores.

7. In a vehicle brake, including a shoe for engaging a rail, a solenoid magnet having a plunger adapted to press the shoe into engagement with the rail upon energization of the magnet, a spring casing located near each end of the brake shoe, a supporting plunger extending between the casing and the adjacent end of the shoe, and equalizing springs acting on each plunger.

8. In a vehicle brake, including a shoe for engaging a rail, a solenoid magnet having a plunger adapted to press the shoe into engagement with the rail upon energization of the magnet, a spring casing located near each end of the brake shoe, a supporting plunger extending between the casing and the adjacent end of the shoe, equalizing springs acting on each plunger, and means for regulating the tension of the springs.

9. In a vehicle brake including a brake shoe, a solenoid magnet having a core with a recess and slot, a brake shoe supporting core movable in the recess and having ears engaging the slot, and a closure at the end of the recess for preventing the brake shoe core from dropping out.

In testimony whereof I affix my signature in presence of two witnesses.

GABRIEL G. GELT.

Witnesses:
JAMES F. SLATTERY,
ROBERT E. FERRY.